April 3, 1962 J. J. PREOTLE ET AL 3,027,735
REFRIGERATING APPARATUS
Filed Jan. 25, 1960 4 Sheets-Sheet 1

INVENTORS
John J. Preotle
BY Charles E. Rembold
Carl A. Stickel
Their Attorney

April 3, 1962     J. J. PREOTLE ET AL     3,027,735
REFRIGERATING APPARATUS

Filed Jan. 25, 1960     4 Sheets-Sheet 2

INVENTORS
John J. Preotle
Charles E. Rembold
BY
Their Attorney

INVENTORS
John J. Preotle
Charles E. Rembold
BY
Their Attorney

April 3, 1962 J. J. PREOTLE ET AL 3,027,735
REFRIGERATING APPARATUS
Filed Jan. 25, 1960 4 Sheets-Sheet 4

INVENTORS
John J. Preotle
BY Charles E. Rembold

Their Attorney

United States Patent Office 3,027,735  
Patented Apr. 3, 1962

3,027,735  
REFRIGERATING APPARATUS  
John J. Preotle and Charles E. Rembold, Dayton, Ohio, assignors to General Motors Corporation, Detroit, Mich., a corporation of Delaware  
Filed Jan. 25, 1960, Ser. No. 4,446  
1 Claim. (Cl. 62—407)

This application in structure and many features is generally similar to our copending application Serial No. 795,443, filed February 25, 1959, which on August 1, 1961, issued as Patent 2,944,207.

This invention relates to refrigerating apparatus and more particularly to frost-free upright home freezers.

Frost-free freezers have come to be popular since the undesirable accumulation of frost on packages is eliminated. However, these have been expensive and the high cost thereof limited the market for such freezers.

It is an object of this invention to provide a frost-free upright freezer which is simple and inexpensive and maintains satisfactory freezing temperatures in all parts of the storage compartment.

It is another object of this invention to provide a frost-free upright freezer with simple, inexpensive air distribution and duct arrangement which insure satisfactory air circulation and satisfactory freezing temperatures throughout the storage compartment.

These and other objects are attained in the form shown in the drawings in which a one-piece distributing duct of plastic resin is provided with outlets at three different levels, each of which are fed by separate ducts. This plastic duct member is ornamental and is placed in front of the rear wall of the storage compartment. The return air passes through ten holes in a bottom door molding member to the evaporator which is located out of but just beneath the storage compartment. The air circulates by a fan at the rear of the evaporator compartment which drives the air from the evaporator air passages and sends the cool air into the plastic duct.

Further objects and advantages of the present invention will be apparent from the following description, reference being had to the accompanying drawings wherein a preferred embodiment of the present invention is clearly shown.

Figure 1:
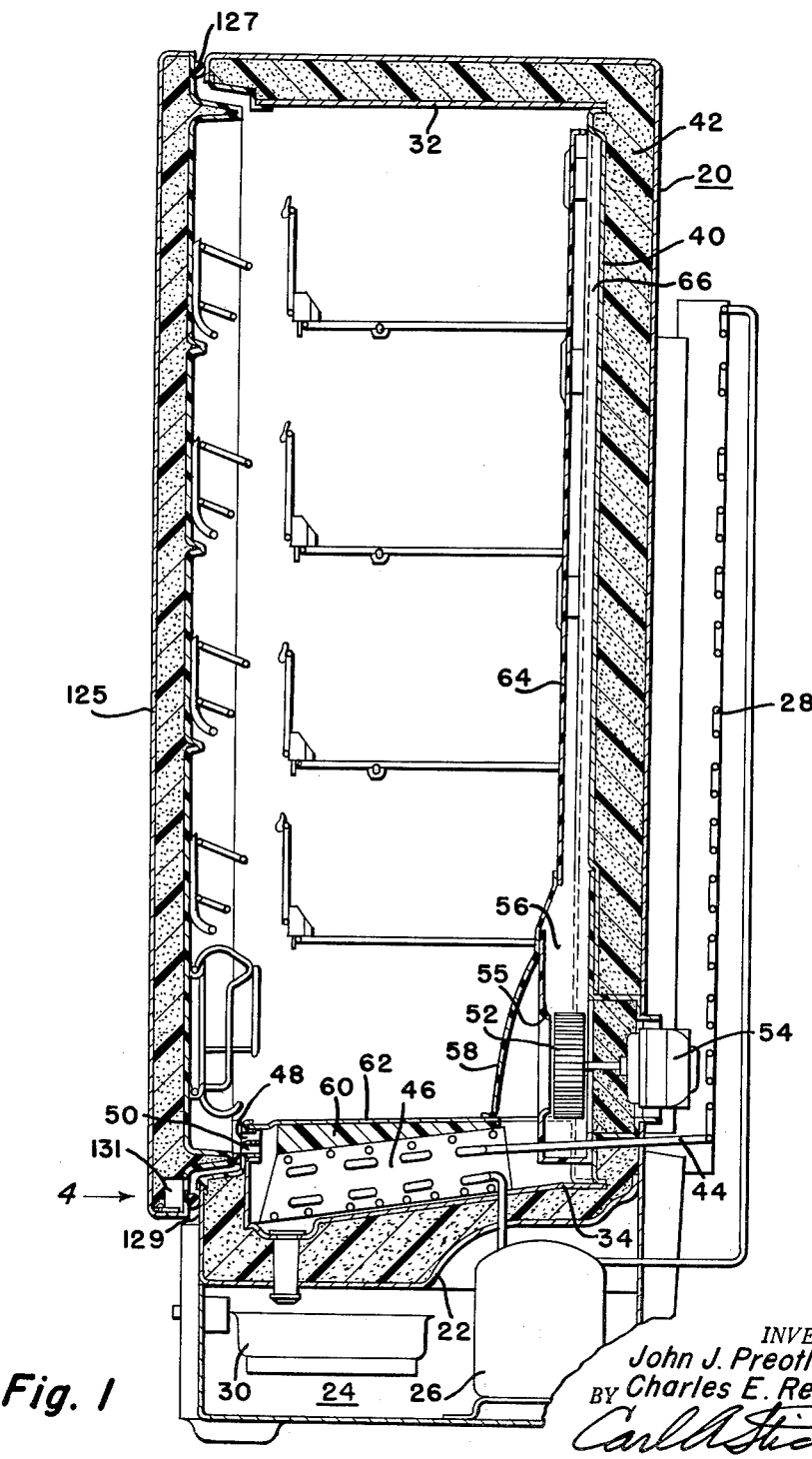
FIGURE 1 is a vertical side sectional view of an upright freezer embodying my invention taken substantially along the line 1—1 of FIGURE 2.
Figure 2:
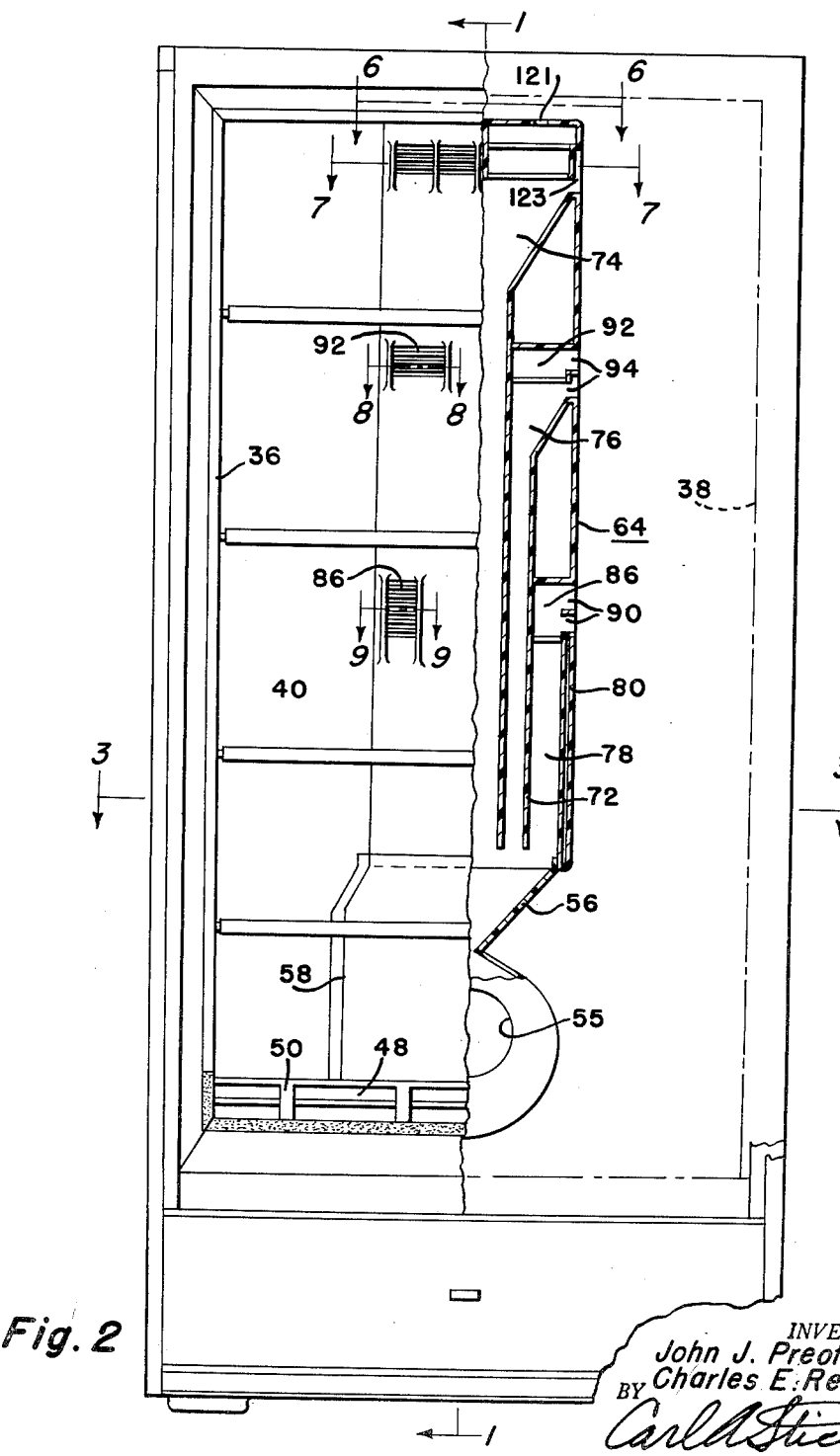
FIGURE 2 is a front view with the door open and also partly in section of the refrigerator shown in FIGURE 1.

Referring now to the drawings, the cabinet is provided with an upright outer shell 20 provided with an irregular bottom wall 22 beneath which is a machine compartment 24. The machine compartment 24 contains a sealed motor-compressor unit 26 which compresses the refrigerant and forwards the compressed refrigerant to the condenser 28 mounted upon the back wall of the outer shell. The machine compartment 24 also contains an evaporating drain pan 30.

Within the outer shell 20 is a sheet metal liner having top and bottom walls 32 and 34, side walls 36 and 38 and a rear wall 40. Between these walls of the inner liner and the outer shell, there is provided suitable insulation 42.

The liquid refrigerant which condenses in the condenser 28 is supplied through a capillary tube 44 to the evaporator 46 which rests upon the bottom wall 34. This evaporator 46 is of the fin and tube type and receives air through ten inlet openings 48 provided in the lower door opening molding 50. The air is drawn through the evaporator 46 from the front to the rear by the centrifugal fan 52 driven by an electric motor 54. This fan is provided with an inlet opening 55 in the discharge shroud 56. A cover 58 connects the rear of the evaporator 46 with the inlet opening 55. The inner liner is provided with a wedge 60 and a false bottom wall 62 over the evaporator 46.

Figure 3:
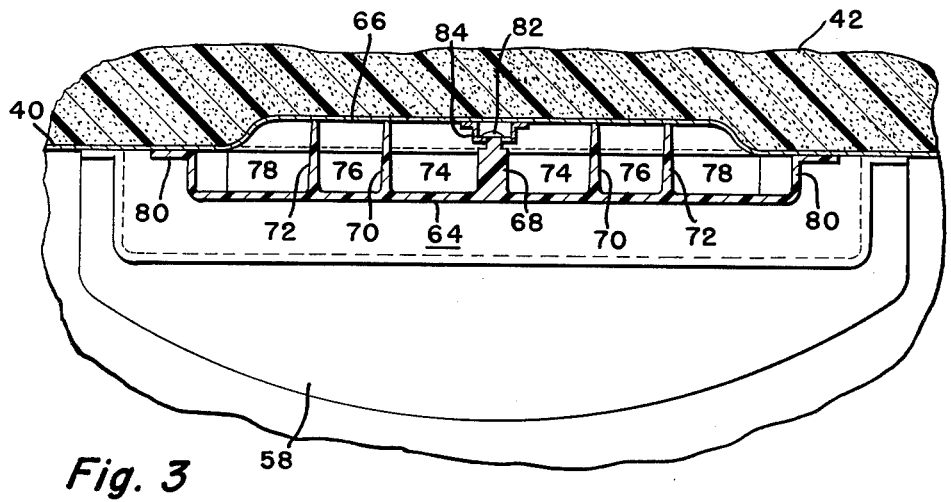
FIGURE 3 is a fragmentary sectional view taken substantially along the line 3—3 of FIGURE 1.
Figure 4:
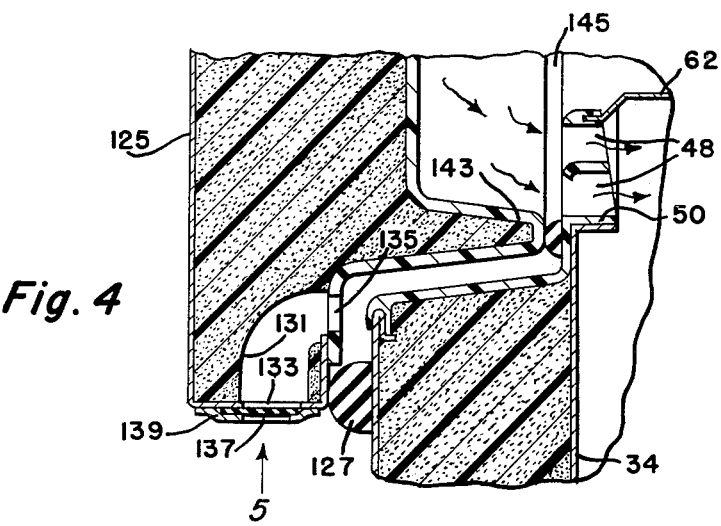
FIGURE 4 is an enlarged sectional view of the lower portion of the door as indicated by the FIGURE 4 in FIGURE 1.
Figure 5:
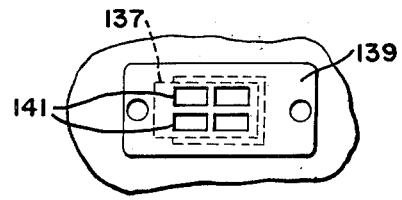
FIGURE 5 is a fragmentary view of the air inlet opening shown as viewed from the position indicated by the number 5 in FIGURE 4.
Figure 6:
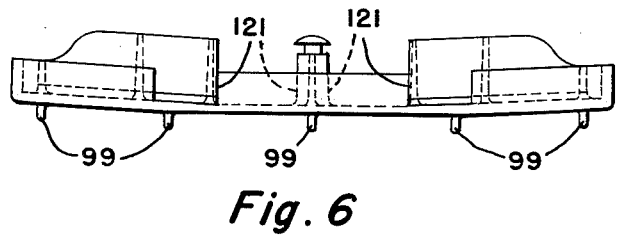
FIGURE 6 is a fragmentary sectional view taken substantially along the line 6—6 of FIGURE 2.
Figure 7:
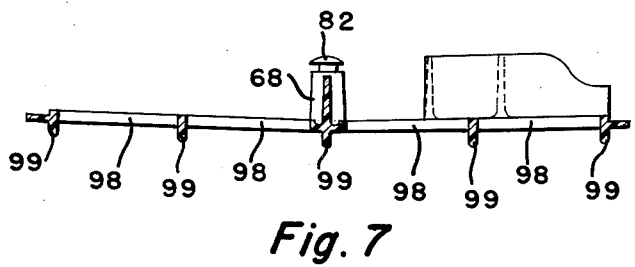
FIGURE 7 is a fragmentary sectional view taken along the line 7—7 of FIGURE 2.
Figure 8:
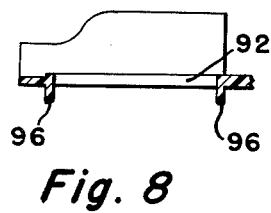
FIGURE 8 is a fragmentary sectional view taken along the line 8—8 of FIGURE 2.
Figure 9:
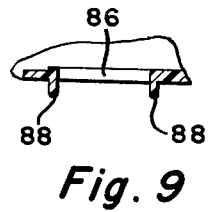
FIGURE 9 is a fragmentary sectional view taken along the line 9—9 of FIGURE 2.

The discharge shroud or scroll of the fan 52 connects with and discharges into a one-piece plastic duct member 64 located in front of the rear wall 40 which is provided with a shallow upwardly extending recess 66 which cooperates with the plastic duct member 64. The plastic duct member 64 is provided with a central vertical rib 68 and sets of ribs 70 and 72 on opposite sides thereof which cooperate with the rear wall 40 to provide separate pairs of ducts 74, 76 and 78 as shown in FIGURE 3. The plastic member 64 is provided with flanged sides 80 cooperating with the rear wall to complete the enclosure of the duct member 64. The plastic duct member 64 is supported by having heads 82 of screws driven into the rear of the central rib 68 which are received in keyhole slots in the vertical channel member 84 provided in the center of the rear wall 40 as shown in FIGURE 3.

The pairs of ducts 78 extend upwardly to the forward facing openings 86 which are provided with ribs 88 on opposite sides to prevent their outlets from being blocked by packages. Side outlets 90 are also provided adjacent the grilled outlets 86 for a lateral distribution of air at this level. It should be noted that these outlets are approximately midway between the top and the bottom of the storage compartment enclosed by the inner liner. The pairs of ducts 76 lead to a pair of grilled outlet openings 92 and to side outlet openings 94 adjacent thereto. These outlet openings are located approximately halfway between the outlet openings 86 and the top of the cabinet. These outlet openings 92 are also flanked by ribs 96 which prevent placing of packages directly adjacent the outlets 92 so as to block the openings thereof. The center passages or ducts 74 connect with the upper outlets 98 in the forward face of the plastic duct member. These outlets 98 are four in number and extend substantially from side to side of the duct member 64. They are also provided with protruding vertical ribs 99 on opposite sides of the openings 98 for preventing blocking of these openings by packages. Also, outlets 121 are provided in the top of the member 64 and also outlet 123 upon opposite sides thereof.

This provides an arrangement for uniform distribution of the cold air throughout the storage compartment. Separate ducts are provided for each set of outlets so that substantially the same relative amount of air is circulated through the different outlets. The upper outlets are made larger in area than the middle outlets and the middle outlets are made larger in area than the lower outlets to compensate for the tendency of the cold air to fall. The upper outlets direct the air against the top wall as well as forwardly and laterally so that the top of the cabinet receives adequate cooling. The middle outlets direct the air laterally and forwardly so that the mid-upper portion receives adequate cooling while the lower outlets distribute the air forwardly and laterally so that the middle of the cabinet receives adequate cooling. The lower portion of the cabinet receives adequate cooling by reason of the fact that the cold air naturally falls and also the outlet from the storage compartment and the inlet to the evaporator is provided by the ten openings 48 in the bottom door molding which naturally causes a downward movement of the cold air which insures adequate cooling of the bottom of the storage compartment.

The storage compartment is closed by an insulated door 125 provided with a magnetic type of gasket seal 127 around its periphery which makes sealing contact with the front face 129 of the outer shell 20. This seal is such an improvement over previous seals that frequently the air within the storage compartment is contracted by cooling to such an extent that a relatively high vacuum is obtained within the storage compartment. This makes the door 125 difficult to open. To prevent this difficulty, I have provided a passage 131 in the bottom of the door 125 extending from a bottom opening 133 below the seal 127 to an opening 135 above the seal into the space between the door 125 and the bottom door opening molding 50. This is provided to allow air from the outside to enter the storage compartment to prevent the creation of a vacuum therein. However, to prevent the escape of air from the storage compartment, there is provided a rubber flapper valve 137 within the perforated plate 139 which is provided with four outlet openings 141. The rubber flapper valve 137 normally covers the four outlet openings so as to prevent the escape of cold air. However, should there be any vacuum within storage chamber, the flapper valve 137 will lift sufficiently to allow air to enter and pass through the passage 131 to prevent the creation of the vacuum in the storage compartment.

The fan 52 normally circulates the air through the passage surrounding the door and particularly between the inner protruding portion 143 of the door 125 and the bottom door opening molding 50. To prevent high air circulation through this area, there is provided an additional seal 145 which is mounted on the front of the door opening molding 50 surrounding the inlet openings 48 on the sides and the bottom thereof which is adapted to be contacted by the projecting portion 143 of the door 125 to block off the space between the bottom of the door 125 and the bottom of the door opening.

While the embodiment of the present invention as herein disclosed, constitutes a preferred form, it is to be understood that other forms might be adopted.

What is claimed is as follows:

A refrigerator including an insulated cabinet formed of insulated vertical walls and an insulated door and insulated spaced horizontal walls enclosing a storage compartment to be cooled, said insulated vertical walls being provided with a finished interior surface, a refrigerant evaporating means in said cabinet adjacent one of said insulated walls, shield means between said evaporating means and said compartment providing a passage and an inlet and an outlet for said passage, said shield means including inlet means extending across the bottom portion of the compartment adjacent the insulated door providing communication between said compartment and said passage, seal means mounted upon said shield means beneath said inlet means cooperating with said insulated door to control the flow of air adjacent said inlet means.

References Cited in the file of this patent
UNITED STATES PATENTS

| | | |
|---|---|---|
| 1,515,546 | Browne | Nov. 11, 1924 |
| 2,119,320 | Dobrowsky | May 31, 1938 |
| 2,417,123 | Philipp | Mar. 11, 1947 |
| 2,571,192 | Brill et al. | Oct. 16, 1951 |
| 2,788,641 | Franklin et al. | Apr. 16, 1957 |
| 2,840,261 | Eichhorn et al. | June 24, 1958 |
| 2,865,531 | Gorst et al. | Dec. 23, 1958 |
| 2,907,180 | Mann | Oct. 6, 1959 |
| 2,944,699 | Oetiker | July 12, 1960 |